US008989971B2

(12) United States Patent
Dell' Eva

(10) Patent No.: US 8,989,971 B2
(45) Date of Patent: Mar. 24, 2015

(54) METHOD AND APPARATUS FOR DETECTING AND COMPENSATING FOR PRESSURE TRANSDUCER ERRORS

(75) Inventor: Mark L. Dell' Eva, Grand Blanc, MI (US)

(73) Assignee: Eaton Corporation, Cleveland, OH (US)

( * ) Notice: Subject to any disclaimer, the term of this patent is extended or adjusted under 35 U.S.C. 154(b) by 1251 days.

(21) Appl. No.: 12/127,460

(22) Filed: May 27, 2008

(65) Prior Publication Data

US 2009/0299583 A1 Dec. 3, 2009

(51) Int. Cl.
| | |
|---|---|
| G06F 7/00 | (2006.01) |
| G06F 17/00 | (2006.01) |
| G06F 19/00 | (2011.01) |
| F16H 59/68 | (2006.01) |
| F16H 61/02 | (2006.01) |
| G01L 27/00 | (2006.01) |

(52) U.S. Cl.
CPC ............ *F16H 59/68* (2013.01); *F16H 61/0251* (2013.01); *G01L 27/002* (2013.01); *F16H 2342/10* (2013.01); *F16H 2059/683* (2013.01)
USPC .................. 701/51; 701/36; 701/52; 701/53; 701/58; 701/60; 701/61; 701/62; 701/67; 701/68

(58) Field of Classification Search
USPC ........... 701/36, 51, 52, 53, 58, 60, 61, 62, 67, 701/68; 477/57, 58, 59, 62, 63, 70, 74, 77, 477/78, 79, 83, 86, 89, 156, 158, 161, 162, 477/163, 164, 166, 179, 180
See application file for complete search history.

(56) References Cited

U.S. PATENT DOCUMENTS

| | | |
|---|---|---|
| 2,080,183 A | 5/1937 | Pigott |
| 3,633,420 A | 1/1972 | Holzem |
| 3,788,142 A | 1/1974 | Goransson |

(Continued)

FOREIGN PATENT DOCUMENTS

| | | |
|---|---|---|
| DE | 102006024087 A1 | 11/2007 |
| EP | 1 433 982 A2 | 6/2004 |

(Continued)

OTHER PUBLICATIONS

International Search Report PCT/IB2009/005746 dated Oct. 16, 2009.

(Continued)

*Primary Examiner* — Dalena Tran
*Assistant Examiner* — Jaime Figueroa
(74) *Attorney, Agent, or Firm* — Rader, Fishman & Grauer PLLC

(57) ABSTRACT

A method and apparatus for detecting and compensating for pressure transducer errors includes a valve for regulating operation of a hydraulic device, a pressure transducer for detecting a pressure output from the valve, and a microprocessor comprising logic for computing a pressure measurement error of the pressure transducer. The pressure transducer is configured to output a pressure reading representing the detected pressure. The pressure measurement error may be computed using a first pressure reading from the pressure transducer taken at an operating condition in which the actual output pressure of the valve is substantially known, together with the substantially known actual output pressure of the valve.

32 Claims, 4 Drawing Sheets

(56) References Cited

U.S. PATENT DOCUMENTS

| | | | |
|---|---|---|---|
| 3,901,031 A | 8/1975 | Knapp et al. | |
| 4,193,299 A | 3/1980 | Holzem et al. | |
| 4,261,229 A | 4/1981 | Mizuno et al. | |
| 4,611,285 A | 9/1986 | Weisman, II | |
| 4,759,184 A | 7/1988 | Kita | |
| 4,776,233 A | 10/1988 | Kita et al. | |
| 4,776,750 A | 10/1988 | Griswold, Jr. et al. | |
| 4,781,080 A | 11/1988 | Iwatsuki | |
| 4,791,568 A | 12/1988 | Hiramatsu et al. | |
| 4,898,333 A | 2/1990 | Kime et al. | |
| 4,919,012 A | 4/1990 | Bolz | |
| 4,931,967 A | 6/1990 | Boe et al. | |
| 4,956,776 A * | 9/1990 | Carre | 701/60 |
| 4,958,538 A * | 9/1990 | Yamashita et al. | 477/39 |
| 4,982,822 A * | 1/1991 | Petzold et al. | 192/3.58 |
| 5,024,638 A | 6/1991 | Sakakibara et al. | |
| 5,062,050 A | 10/1991 | Petzold et al. | |
| 5,113,725 A * | 5/1992 | Tomomatsu et al. | 475/134 |
| 5,170,342 A | 12/1992 | Nakamura et al. | |
| 5,214,983 A | 6/1993 | Kobayashi et al. | |
| 5,265,356 A | 11/1993 | Winter | |
| 5,274,557 A | 12/1993 | Moriya et al. | |
| 5,337,629 A * | 8/1994 | Kita | 477/52 |
| 5,339,685 A * | 8/1994 | Janssen et al. | 73/199 |
| 5,438,771 A | 8/1995 | Sahm et al. | |
| 5,446,980 A | 9/1995 | Rocke | |
| 5,493,798 A | 2/1996 | Rocke et al. | |
| 5,528,843 A | 6/1996 | Rocke | |
| 5,535,532 A | 7/1996 | Fujii et al. | |
| 5,540,083 A * | 7/1996 | Sato et al. | 73/40 |
| 5,579,244 A * | 11/1996 | Brown | 700/301 |
| 5,623,093 A | 4/1997 | Schenkel et al. | |
| 5,659,985 A | 8/1997 | Stump | |
| 5,832,637 A | 11/1998 | Aguado et al. | |
| 5,899,007 A | 5/1999 | Niemela et al. | |
| 5,899,829 A | 5/1999 | Salecker et al. | |
| 5,918,195 A | 6/1999 | Halgrimson et al. | |
| 6,076,030 A | 6/2000 | Rowe | |
| 6,179,739 B1 * | 1/2001 | Tsai et al. | 474/12 |
| 6,256,566 B1 | 7/2001 | Kamiya et al. | |
| 6,401,456 B1 | 6/2002 | Moriya et al. | |
| 6,533,702 B1 * | 3/2003 | Asyama et al. | 477/45 |
| 6,591,177 B1 * | 7/2003 | Loffler | 701/63 |
| 6,615,114 B1 | 9/2003 | Skiba et al. | |
| 6,807,472 B2 * | 10/2004 | Ford et al. | 701/58 |
| 7,484,429 B2 * | 2/2009 | Adams et al. | 74/335 |
| 7,849,986 B2 * | 12/2010 | Kitou et al. | 192/3.58 |
| 2004/0122577 A1 * | 6/2004 | Ford et al. | 701/58 |

FOREIGN PATENT DOCUMENTS

| | | |
|---|---|---|
| JP | 58-142063 U | 9/1983 |
| JP | 62-124354 U | 8/1987 |
| JP | 62-292959 A | 12/1987 |
| JP | 63-167171 U | 10/1988 |
| JP | 64-040757 U | 3/1989 |
| JP | 1-277636 A | 11/1989 |

OTHER PUBLICATIONS

English Abstract provided for EP1433982 (A2).
English Abstract for JP1-277636.
English Abstract for JP58-142063.
English Abstract for JP64-040757.
English Abstract for JP63-167171.
English Abstract for JP62-124354.
English Abstract for DE-102006024087-A1.

* cited by examiner

METHOD AND APPARATUS FOR DETECTING AND COMPENSATING FOR PRESSURE TRANSDUCER ERRORS

TECHNICAL FIELD

The present disclosure relates in general to pressure transducers, and more particularly to a method and apparatus for improving the measurement accuracy of a pressure transducer employed in a closed-loop system.

BACKGROUND

Electronically controlled solenoid operated valves provide improved shifting capabilities of a transmission compared to hydro-mechanical shift control and, in particular, permits staged or progressive release and application of clutches, such as band clutches and/or plate clutches, for effecting smoother speed changes in the transmission. In currently-known production transmissions, these valve assemblies are mounted internally on the transmission valve body and supplied with pressurized fluid from a pump disposed in the transmission. Shifting is performed using open-loop control of the valves, which requires time-consuming and costly calibration of each valve in the transmission system. However, even if the calibration is initially accurate, over time it may become less so due to the wear of parts in the transmission, degradation of transmission fluid, inherent nonlinearities in the system's behavior, etc., which in turn may negatively impact the shifting performance of the transmission. Moreover, present systems are inherently prone to error while in operation due to electrical load variations, pressure pulsations, temperature fluctuations, and other system non-linearities.

Closed-loop control of solenoid operated valves has been proposed as a way to obviate the need for precise calibration of the solenoid pilot and regulating valves used for clutch engagement and line pressure regulation in an automatic speed change transmission. Closed-loop control may include providing a feedback signal indicative of the torque transmitted by a particular shifting clutch band or plate to the solenoid valve. The pressure applied to the clutch actuator by the transmission hydraulic fluid is an indication of the clutch transmitted torque. Closed-loop control of a transmission system may be done by employing pressure transducers to sense the hydraulic pressure to each clutch actuator. An electrical signal corresponding to the detected pressure is transmitted to a transmission control unit (TCU). The transmission control unit then determines the difference between the actual sensed pressure and a target pressure corresponding to the desired output pressure to the actuators. The transmission control unit controls the current level or the duty-cycle sent to either a linear or pulse-width-modulated (PWM) solenoid-operated valve to control the clutch regulator valve or the clutch actuator directly until the actual pressure reaches the target pressure.

Accurate control of the closed-loop transmission system can be affected how precisely the hydraulic pressure applied to the clutch actuator can be measured. Piezoelectric pressure transducers are often a viable choice in many pressure sensing applications because of their low cost. Their use, however, does impose potential design challenges due to their non-linear response, low output signal strength, and temperature sensitivity. For example, piezoelectric pressure transducers typically require signal amplification and correction for non-linearities. Further, piezoelectric pressure transducers may be sensitive to internal stresses that can be erroneously detected by the pressure transducer as a pressure. Undesirable and often unavoidable, internal stresses may occur when the pressure transducer is attached to another component. The extreme temperature conditions that the pressure transducers are subjected to may also produce thermal stresses within the pressure transducer that may produce a false pressure reading. These and other operating conditions may detrimentally impact the accuracy of the pressure transducers.

DETAILED DESCRIPTION

Figure 1:
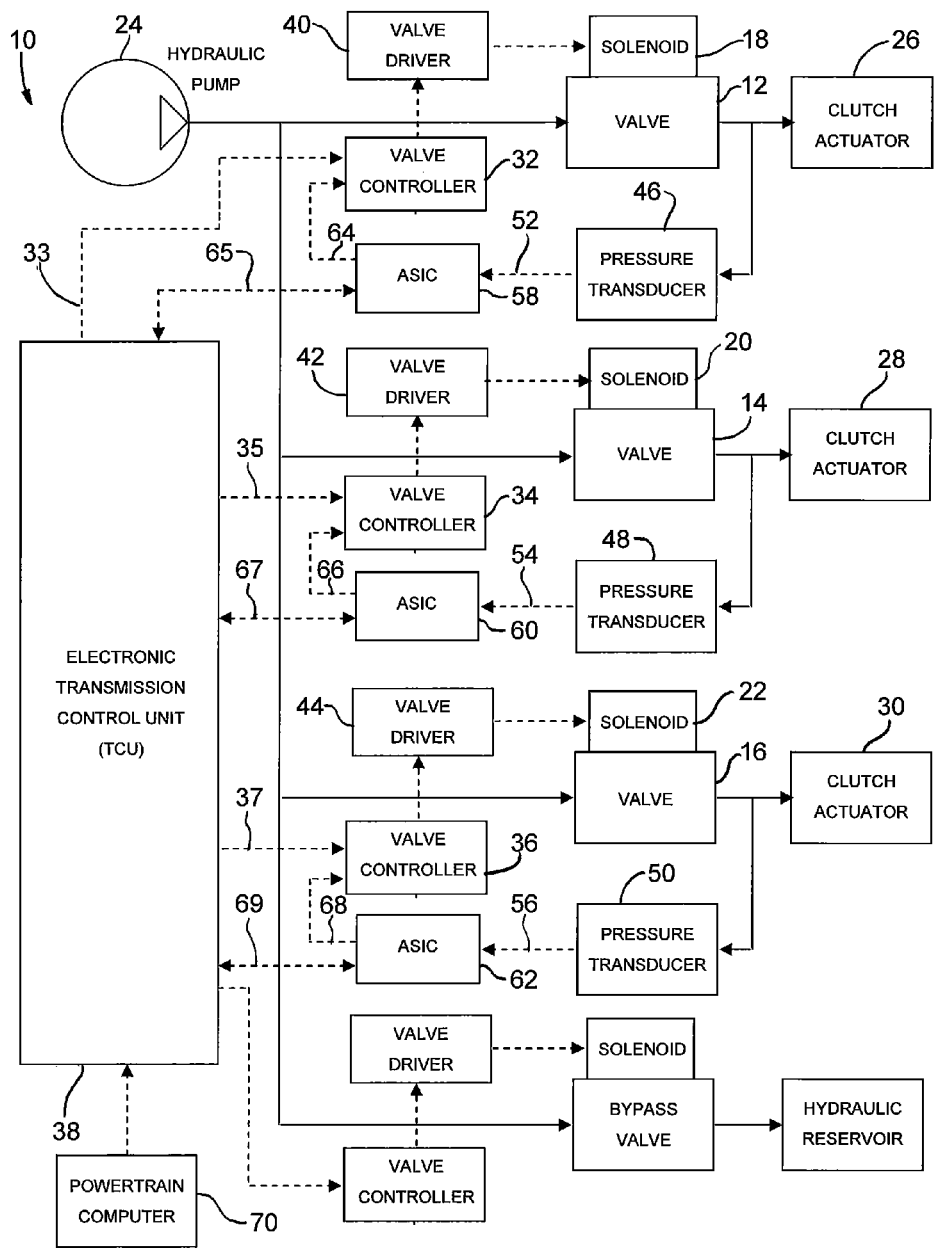
FIG. 1 is a schematic representation of an exemplary closed-loop transmission control system.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or otherwise limit or restrict the claims to the precise forms and configurations shown in the drawings and disclosed in the following detailed description.

The term "valve" or any variation thereof as used throughout the specification is defined hereinafter to include but is not limited to: any of various devices that regulate the flow of fluids such as gases, liquids, or loose particles through piping or through apertures by opening, closing, or obstructing ports or passageways; and any of various mechanical or electrical devices by which the flow of a fluid may be started, stopped, or regulated by a movable part that opens, shuts, or partially obstructs one or more ports or passageways.

The term "transducer" or any variation thereof as used throughout the specification is defined hereinafter to include but is not limited to: a device that receives and responds to a signal or stimulus; and any device that receives a signal or stimulus (e.g. as heat or pressure or light or motion) and responds to it in a distinctive manner.

The term "pressure" or any variation thereof as used throughout the specification is defined hereinafter to include but is not limited to: the force applied to a unit of area or volume; measured in pascals (SI unit) or in dynes (cgs unit) or in pounds per square inch.

The term "hydraulic" or any variation thereof as used throughout the specification is defined hereinafter to include, but is not limited to: of, involving, moved by, or operated by, a fluid under pressure.

The term "data" or any variation thereof as used throughout the specification is defined hereinafter to include but is not limited to: factual information, especially information organized for analysis or used to reason or make decisions; values derived from scientific experiments; and numerical or other information represented in a form suitable for processing by computer.

The term "pump" or any variation thereof as used throughout the specification is defined hereinafter to include but is not limited to: a machine or device for raising, compressing, or transferring fluids.

FIG. 1 schematically illustrates an exemplary closed-loop pressure control system 10 for a vehicle transmission. Solid lines interconnecting the various components of pressure control system 10 denote fluid pathways, whereas dashed lines represent electronic communication pathways. Pressure control system 10 can be used, for example, to control actuation of various transmission components, such as clutches for effecting speed (gear) shift changes. Pressure control system 10 may include various transducers for detecting the pressure used to actuate the transmission components. The accuracy of the pressure transducers may have an impact on the precision with which the transmission components can be controlled. Inaccurate pressure readings could result in an improper pressure being applied to the transmission component, making precise control of the component difficult. To compensate for the inaccuracies of the pressure transducer, the herein described exemplary pressure measurement correction scheme may be employed with pressure control system 10 to compensate for pressure transducer errors that may limit the precision with which the transmission components can be controlled. It shall be understood that pressure control system 10 is merely one example of a pressure control system that may employ the exemplary pressure measurement correction scheme. It shall also be appreciated that the pressure measurement correction scheme may be used with a variety of differently configured pressure control systems employing pressure transducers, as well as other applications that utilize pressure transducers, without departing from the scope of the invention.

Pressure control system 10 may include a plurality of solenoid operated valves 12, 14 and 16. Valves 12, 14 and 16 each include a solenoid 18, 20 and 22, respectively, operable for opening and closing the corresponding valve in response to a control signal. Valves 12, 14 and 16 may be any kind of proportional valve, such as a variable bleed solenoid (VBS) valve, or a variable force solenoid (VFS) valve. Valves 12, 14 and 16 may also be a pressure width modulation (PWM) valve. VBS and VFS valves are also known as proportional valves because they regulate pressure based on the valve being open or partially open. A PWM valve, by contrast, operates on a duty cycle that comprises a percentage of time within a period of time during which the valve is open. By opening and closing the PWM valve during the duty cycle, the PWM valve emulates the steady state behavior of the VBS valve. Although three valves are illustrated in FIG. 1, it shall be appreciated that in practice fewer or more valves may be employed depending on the requirements of the particular application.

Valves 12, 14 and 16 can be fluidly connected to a hydraulic pump 24 operable for supplying pressurized fluid to the valves. Pump 24 can be driven by a transmission input shaft or another device capable of outputting a rotational torque for driving the pump.

Valves 12, 14 and 16 can be fluidly connected to a corresponding hydraulically actuated transmission component, such as clutch actuators 26, 28 and 30, respectively. Clutch actuators 26, 28 and 30 may be used to activate an automatic transmission device, such as a band clutch, plate clutch, or other similar device. Valves 12, 14 and 16 are operable to control the amount of torque transmitted by the respective clutch during a speed (gear) change by selectively adjusting the pressure applied to the respective clutch actuators 26, 28 and 30.

Operation of valves 12, 14 and 16 may be controlled by valve controllers 32, 34 and 36, respectively. Each valve controller 32, 34 and 36 can communicate electronically with a corresponding transmission control unit 38. The electronic communication links between transmission control unit 38 and valve controllers 32, 34 and 36 are represented in FIG. 1 by dashed lines 33, 35, and 37, respectively, and may include both wired and wireless modes of communication. Transmission control unit 38 may output to valve controllers 32, 34 and 36 a command pressure control signal indicative of a desired pressure to be output from valves 12, 14 and 16. Valve controllers 32, 34 and 36, using predetermined heuristic rules, instruct a corresponding valve driver 40, 42 and 44, respectively, which may be an excitation driver capable of producing a desired voltage, to emit a certain voltage. The heuristic rules implemented in valve controllers 32, 34 and 36 may comprise a variable gain control structure, such as that described in U.S. Pat. No. 7,194,349, entitled "Closed-Loop, Valve-Based Transmission Control Algorithm", the disclosure of which is incorporated herein by reference in its entirety.

Transmission control unit 38 and valve controllers 32, 34 and 36 may each comprise at least one microprocessor. Although illustrated in FIG. 1 as separate components, transmission control unit 38 may also be combined with one or more valve controllers 32, 34 and 36 in a single microprocessor. The microprocessors generally include one or more memories for storing instructions, such as those described herein, for determining and compensating for inaccurate pressure readings, and one or more processors for executing the instructions. Various steps and processes disclosed herein may be embodied in whole or in part in such instructions.

Valve controllers 32, 34 and 36 are capable of receiving as input information relating to a desired output pressure state of the corresponding valves 12, 14 and 16, and applying heuristic rules to instruct the corresponding valve drivers 40, 42 and 44 to produce a certain voltage based at least in part on the received information. Solenoids 18, 20 and 22, which are capable of receiving voltage from corresponding valve drivers 40, 42 and 44, operate to open and close valves 12, 14 and 16, respectively, in response to the received voltage.

A pressure transducer 46, 48 and 50 may be employed to detect and monitor the output pressure of valves 12, 14 and 16, respectively. Pressure transducers 46, 48 and 50 may include any of a variety of pressure transducers, including but not limited to a piezoelectric sensor. Each pressure transducer 46, 48 and 50 may be configured to output an electrical signal representing the detected pressure. Generally, the electrical signal accurately reflects the pressured detected by the transducer, provided the transducer has been properly calibrated. Certain conditions may occur, however, that may cause the pressure transducer to output an inaccurate pressure signal. For example, the process of attaching the pressure transducer to another component, such as a transmission manifold, may cause the pressure transducer housing to become distorted. The pressure transducer may detect the distortion and erroneously interpret it as a pressure. This may be particularly true when using piezo-electric sensors. A correction scheme for detecting and compensating for such false pressure readings is described in more detail subsequently.

The electrical signal produced by pressure transducer 46, 48 and 50 (represented by dashed lines 52, 54 and 56, respectively, in FIG. 1) may be received by a corresponding application specific integrated circuit (ASIC) 58, 60 and 62, respectively. ASICs 58, 60 and 62 are capable of receiving as input information relating to the output pressure state of valves 12, 14 and 16, respectively, as detected by corresponding pressure transducers 46, 48 and 50. ASICs 58, 60 and 62 may be configured to perform a variety of functions, such as conditioning the signal received from the corresponding pressure transducer for transmission to transmission control unit 38 and valve controllers 32, 34 and 36. The ASICs may also be capable of storing pressure and pressure transducer calibration data in an internal memory for retrieval at a later time as required.

Each ASIC 58, 60 and 62 can communicate electronically with corresponding valve controllers 32, 34 and 36, respectively, and transmission control unit 38. The electronic communication links between ASICs 58, 60 and 62 and corresponding valve controllers 32, 34 and 36 are represented in FIG. 1 by dashed lines 64, 66, and 68, respectively, and may include both wired and wireless modes of communication. The electronic communication links between ASICs 58, 60 and 62 and transmission control unit 38 are represented in FIG. 1 by dashed lines 65, 67 and 69, respectively, and may include both wired and wireless modes of communication. The electronic communication may be unidirectional or bidirectional. Unidirectional communication occurs when only one of the two devices is capable of sending a communication signal to the other device. For example, the ASIC may be configured to send a communication signal to the transmission control unit indicative of the pressure detected by the corresponding pressure transducer, but may not be configured to receive a communication signal from the transmission control unit. Bidirectional communication, on the other hand, occurs when both the ASIC and the transmission control unit are capable of communicating with one another.

ASICs 58, 60 and 62 each comprise at least one microprocessor. Although shown as two separate components in FIG. 1, transmission control unit 38 and one or more ASICs 58, 60 and 62 may be combined into a single microprocessor. The microprocessors generally include one or more memories for storing instructions, such as those described for determining and compensating for inaccurate pressure readings, and one or more processors for executing the instructions. Various steps and processes disclosed herein may be embodied in whole or in part in such instructions.

Transmission control unit 38 can be may be programmed to provide the desired shift characteristics for a particular vehicle and engine-transmission combination based on input received from a powertrain computer 70 and ASICs 58, 60 and 62. Examples of the various types of input that transmission control unit 38 may receive from powertrain computer 70 include, manifold vacuum, engine operating temperature, gear selection, throttle position, as well as others. Transmission control unit 38 can produce a command pressure output signal corresponding to the desired pressure, which can be sent to valve controllers 32, 34 and 36.

Pressure transducers 46, 48 and 50 may provide input to transmission control unit 38 and valve controllers 32, 34 and 36 by way of ASICs 58, 60 and 62, respectively. Valve controllers 32, 34 and 36 provide instructions to valve drivers 40, 42 and 44, respectively, that are based at least in part on a determination of the pressure output from corresponding valves 12, 14 and 16. Valve controllers 32, 34 and 36 may receive as input from transmission control unit 38 a command pressure value, and from a corresponding pressure transducer 46, 48 and 50 a measured pressure reading. The control logic implemented in valve controllers 32, 34 and 36 determines what adjustments to make to the valve setting of corresponding valves 12, 14 and 16 to cause the output pressure to equal, or more closely approximate, the command pressure received from transmission control unit 38.

Computing devices such as those used for transmission control unit 38, ASICS 58, 60 and 62, and valve controllers 32, 34 and 36, may each include one or more memories for storing, and one or more processors for executing, instructions for operating the associated components. Various steps and processes disclosed herein may be embodied in whole or in part in such instructions. Computer-executable instructions may be compiled or interpreted from computer programs created using a variety of programming languages and/or technologies. In general, a processor, such as a microprocessor, receives instructions, for example, from a memory, a computer-readable medium, and the like, and executes the instructions in connection with performing one or more processes, including one or more of the processes described herein. Such instructions and other data may be stored and transmitted using a variety of computer-readable media.

A computer-readable medium may include any tangible medium that participates in providing data (e.g., instructions), which may be read by a computer. Such a medium may take many forms, including, but not limited to, non-volatile media and volatile media. Non-volatile media include, for example, optical or magnetic disks and other persistent memory. Volatile media include dynamic random access memory (DRAM), which typically constitutes a main memory. Such instructions may be transmitted by one or more transmission media, including coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, a RAM, a PROM, an EPROM, a FLASH-EEPROM, any other memory chip or cartridge, or any other medium from which a computer can read.

Figure 2A:
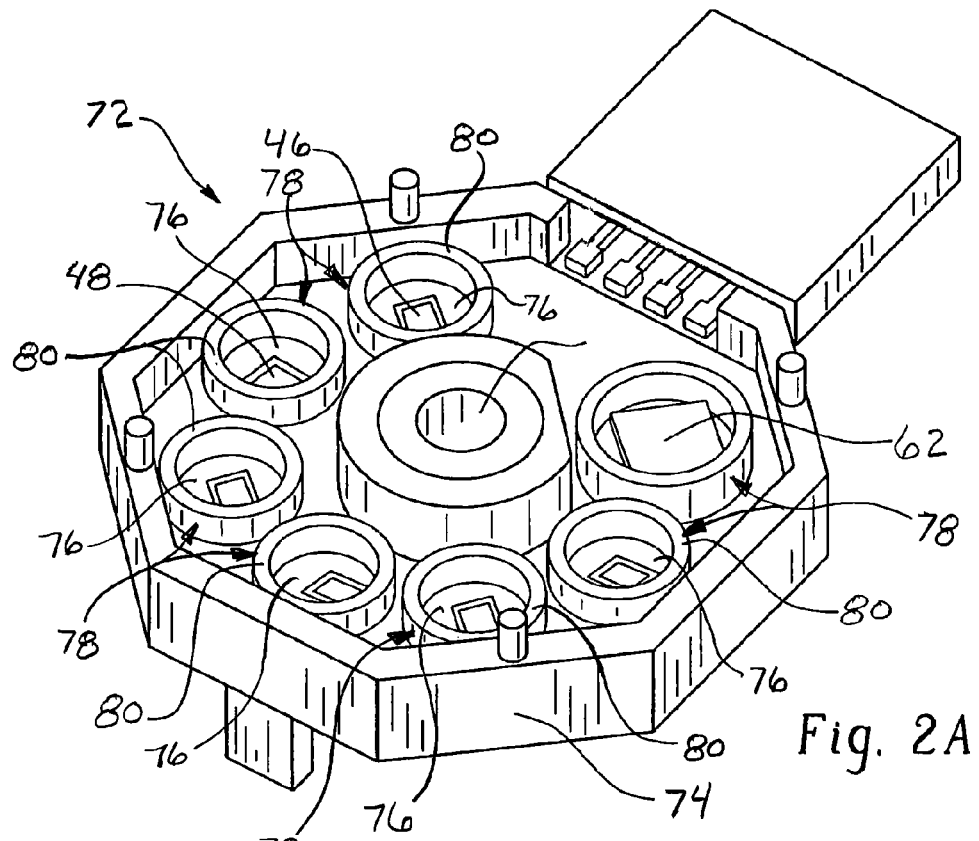
FIGS. 2A and 2B are representative top and bottom perspective views of an exemplary unitary pressure sensor package.
Figure 2B:
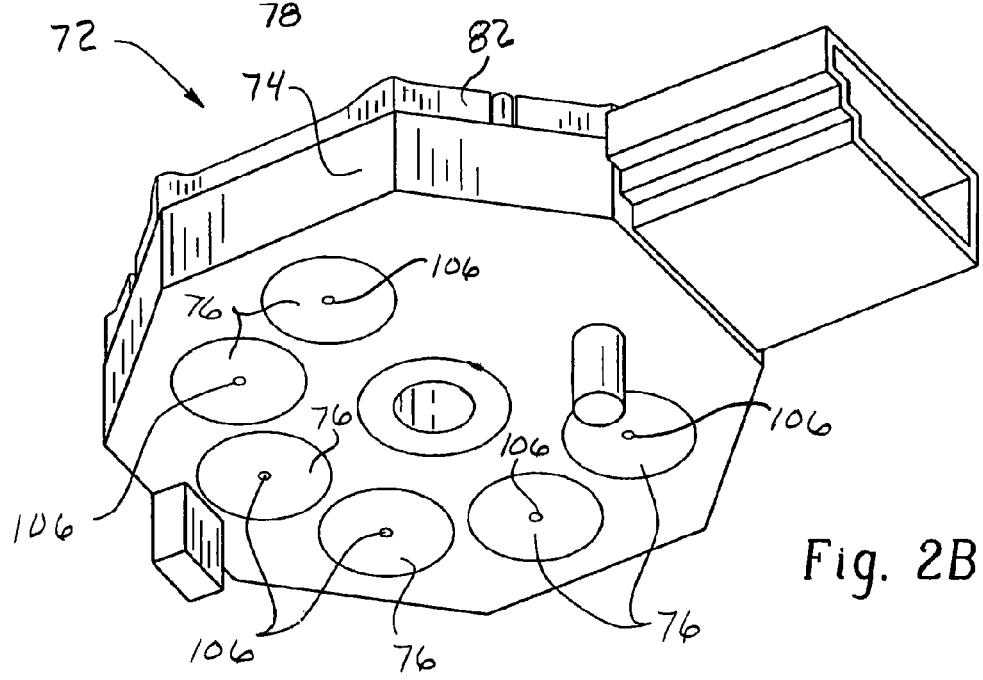

Pressure transducers 46, 48 and 50 may be packaged in a variety of ways to suite the needs of the particular application. FIGS. 2A and 2B illustrate an exemplary unitary sensor package 72 in which multiple pressure transducers are arranged in a common housing 74. Sensor package 72 can readily be incorporated into pressure control system 10, for example, by attachment to transmission control unit 38 or to a fluid distribution manifold as described in more detail subsequently. Examples of various packaging configurations are described in commonly assigned, co-pending U.S. patent application Ser. No. 11/235,614 entitled "Pressure Transducer Package for a Manifold", and U.S. patent application Ser. No. 11/447,323 entitled "Manifold Assembly Having a Centralized Pressure Sensing Package", the disclosures of which are incorporated herein by reference in their entirety.

The pressure transducers (including pressure transducers 46, 48 and 50 of FIG. 1) are shown arranged in a generally circular or polygonal configuration in housing 74. The pressure transducers are supported by a substrate 76 that can be attached to housing 74. Alternatively, substrate 76 may be formed as an integral part of housing 74. Each pressure transducer may be individually enclosed within a separate sensor compartment 78 defined by upstanding wall 80. Enclosing the pressure transducers in separate compartments may help stabilize the sensors and may provide additional protection against damage that could result from operating in corrosive environments. Each ASIC 58, 60 and 62 may also be located in the same sensor compartment 78 used to enclose the ASIC's corresponding pressure transducer.

The electronics in sensor package 72 can be protected from the surrounding environment by suitably attaching a cover 82 to housing 74. It shall be understood that sensor package 72 is merely one example of a variety of possible sensor packaging arrangements. Other packaging configurations are also possible depending on the requirements of a particular application. There is no requirement that the pressure transducers be arranged in a common housing. Each pressure transducer may be packaged in its own separate housing.

Figure 3:
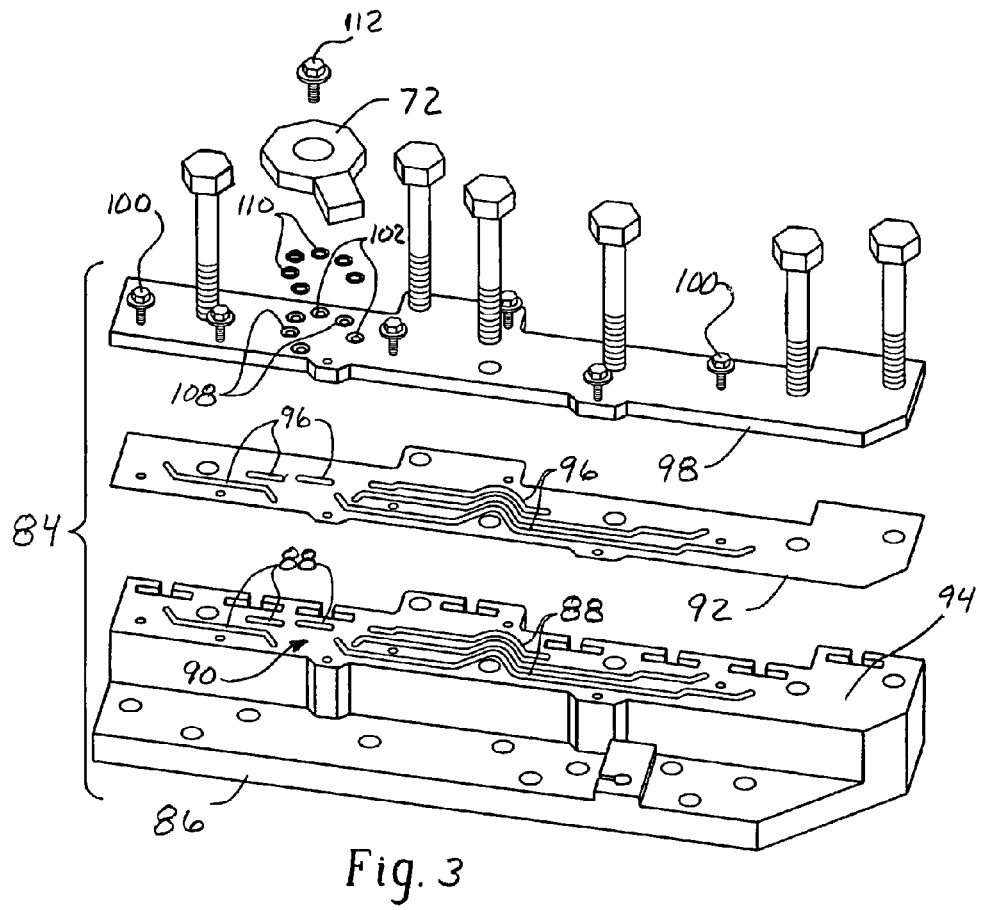
FIG. 3 is an exploded top perspective view of an exemplary transmission manifold employing the unitary sensor package.
Figure 4:
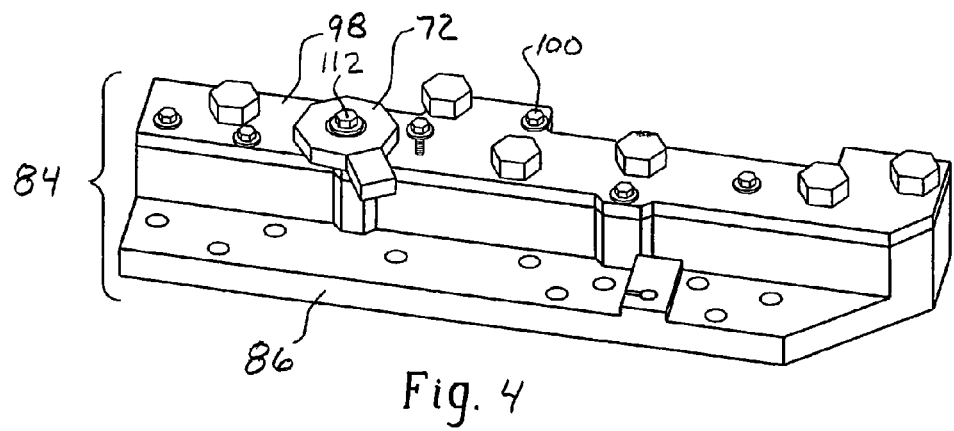
FIG. 4 is a top perspective view of the exemplary transmission manifold of FIG. 3 shown in an assembled condition.

Referring to FIGS. 1, 3 and 4, sensor package 72 may be attached to a separate component, such as a manifold 84. Manifold 84 may have any of a variety of configurations depending on the requirements of the particular application. For example, manifold 84 may include a body 86 that includes hydraulic channels passages 88 for fluidly connecting pressure transducers 46, 48 and 50 to corresponding clutch actuators 26, 28 and 30, respectively. Hydraulic channels 88 can be configured to route fluid to a generally central location 90 where sensor package 72 can be attached. Manifold 84 may also include a gasket 92 disposed along a surface 94 of manifold body 86 to act as a seal. Gasket 92 includes a plurality of openings 96 corresponding generally to hydraulic channels 88 in manifold body 86. A manifold cover 98 can be used to close off hydraulic channels 88. Manifold cover 98 may be attached to manifold body 86 using a plurality of threaded fasteners 100, thereby trapping gasket 92 between manifold body 86 and manifold cover 98.

Manifold cover 98 may include a cluster of orifices 102 arranged around central location 90 to form a series of pressure ports that fluidly adjoin hydraulic channels 88 when cover 98 is attached to manifold body 86. Each pressure orifice 102 fluidly connects to a corresponding pressure port 106 extending through substrate 76 of sensor package 72 (see FIG. 2b). Pressure ports 106 are in fluid communication with corresponding pressure transducers 46, 48 and 50 (see FIG. 1). Each orifice 102 may include a counterbore 108 for receiving an O-ring 110 to form fluid-tight paths between orifices 102 in manifold 84 and pressure ports 106 in manifold cover 98. Sensor package 72 may also be sealed against manifold cover 98 using a gasket or another sealing system capable of providing a suitable seal to prevent fluid from being discharged through the interface between the two components. Sensor package 72 may be attached to manifold 84 using, for example, a threaded fastener 112, or another suitable attaching mechanism, such as a rivet, stud and nut fastening system, as well as others.

Referring to FIG. 1, clutch actuators 26, 28 and 30 can be activated by selectively opening and closing corresponding valves 12, 14 and 16, respectively. Valve controllers 32, 34 and 36 can receive as input two pressure values. A command pressure (sometimes referred to as a control pressure), is received from transmission control unit 38, and a measured pressure signal representing the pressure output from the valves is received from ASICs 58, 60 and 62, respectively. Based on the command pressure received from transmission control unit 38, valve controllers 32, 34 and 36 provide input to corresponding valve drivers 40, 42 and 44. Where the valve is a VBS valve, the input to the valve driver causes the valve to open in an amount necessary to achieve the desired pressure commanded by transmission control unit 38. Where the valve is a PWM valve, the input to the valve driver defines the duty cycle for achieving the command pressure.

Various factors, including but not limited to, wear of parts in the transmission, degradation of transmission fluid, inherent nonlinearities in the system's behavior, as well as other factors, may cause the pressure output from a particular valve to vary from the pressure commanded by transmission control unit 38. Valve controllers 32, 34 and 36 can be configured to determine a valve output pressure error by computing the difference between the command pressure and the valve output pressure as detected by pressure transducers 46, 48 and 50. If the valve output pressure error falls within a predetermined acceptable range, the pressure output from the valve is deemed to match the pressure commanded by transmission control unit 38 and no further corrective action is necessary to compensate for the pressure measurement error. If, on the other hand, the valve output pressure error falls outside the predetermined acceptable range, the valve controller can provide input to the corresponding valve driver that adjusts the valve setting to achieve the command pressure.

The accuracy of the pressure reading produced by pressure transducers 46, 48 and 50 may affect the accuracy of the valve output pressure error computed by valve controllers 32, 34 and 36. Inaccurate pressure readings may result in the valve controller computing an incorrect valve output pressure error. This in turn could lead to improper adjustments being made to the valve setting in an attempt to achieve the command pressure.

Although the pressure transducer may have been properly calibrated initially, certain conditions may subsequently occur that could adversely effect the calibration. For example, the process of installing sensor package 72 to manifold 84 may cause housing 74 to become slightly distorted. This distortion may be detected by the pressure sensor and erroneously interpreted as a pressure. The pressure transducers may also be subjected to temperature changes that may affect the accuracy of the pressure readings. Thermal gradients occurring within housing 74, substrate 76, or the pressure transducer itself, for example, may also affect the accuracy of the pressure transducer. Atmospheric pressure changes due to altitude and weather can also have an effect on the calibration of the pressure transducer. These are only of few of the conditions that may adversely affect the pressure transducer calibration. Changes in pressure transducer calibration may be permanent or transient.

To compensate for permanent as well as transient changes in the calibration of pressure transducers 46, 48 and 50, a pressure reading may be periodically taken at various operating conditions in which the pressure output from the valve is generally at least substantially known (and possibly essentially exactly known). Examples of operating conditions during which the pressure output may be considered substantially known include, but are not limited to, when the vehicle transmission is placed in park (valves 12, 14 and 16 are generally closed when the transmission is in park); when transmission control unit 38 sends a control signal that causes a particular valve to close, such as may occur during gear shift change; and the period after the vehicle has just been started and the pump pressure has not yet had a chance to build up. An output pressure of five pounds per square inch (5 psi) or less will generally be considered close enough to zero for the output pressure to be considered substantially know. A pressure measurement error can be computed based on the difference between the detected pressure and the actual known pressure. The pressure measurement error can be added to subsequent pressure readings of the affected pressure transducer to at least partially compensate for changes in its calibration.

Known pressure conditions that may be used to assess the pressure transducer calibration include, but are not limited to, operating conditions in which the pressure output from the valve is substantially zero. This may occur, for example, when valves 12, 14 and 16 are closed. Valves 12, 14 and 16 are generally closed when the vehicle ignition is first turned on but the engine has not yet started. Turning on the ignition activates the transmission electronics, including electronic transmission control 38, pressure transducers 46, 48 and 50, and pressure ASICs 58, 60 and 62. Hydraulic pump 24 is not yet supplying pressurized fluid to the hydraulic system since the vehicle engine has not yet started, and pressure transducers 46, 48 and 50 should accordingly produce a zero pressure reading. A pressure reading other than zero may indicate a shift in the calibration of the corresponding pressure transducer. A non-zero pressure reading represents the pressure measurement error that can be added to subsequent pressure readings of the affected pressure transducer to at least partially correct for the shift in the pressure transducer calibration.

Other transmission operating conditions in which the output pressure of valves 12, 14 and 16 is substantially known may include any time the valves are closed. For example, the valves are typically closed prior to commencing a speed (gear) shift change. A gear shift can be initiated by transmission control unit 38 transmitting a command pressure signal to the appropriate valve controller 32, 34 and 36 that causes the corresponding valve 12, 14 and 16 to open and deliver the desired pressure. Since the valve is closed prior to commencing the gear shift, it can be expected that the corresponding pressure transducers 46, 48 and 50 will produce a pressure reading of zero. A pressure reading other than zero may indicate a shift in the calibration of the respective pressure transducer. The detected pressure measurement error, which corresponds to the pressure transducer pressure reading, can be added to subsequent pressure readings of the pressure transducer to arrive at a corrected pressure reading.

The calibration of each pressure transducer 46, 48 and 50 may also be periodically checked while the vehicle is being operated. Transmission control unit 38 may be configured to track the current operating condition of each of the clutch actuators 26, 28 and 30. Transmission control unit 38 may also monitor the pressure detected by pressure transducers 46, 38 and 50. Prior to issuing a command pressure to activate one of the clutch actuators to initiate a gear shift, for example clutch actuator 26, a pressure reading may be obtained from a corresponding pressure transducer, in this case pressure transducer 46. The pressure reading can be compared against the pressure commanded by transmission control unit 38. Since transmission control unit 38 has not yet activated clutch actuator 26, valve 12 will be in a closed position and the pressure output from valve 12 should be substantially zero. A pressure reading other than substantially zero (plus or minus a selected tolerance range) indicates that the pressure sensor calibration may be outside an acceptable tolerance range.

Transmission control unit 38 and ASICs 58, 60 and 62, may include logic for computing the pressure measurement error. The computed pressure measurement error may be used by the device in which it was computed or may be transmitted to another device. For example, a pressure measurement error computed by transmission control unit 38 may be transmitted for use by ASICs 58, 60 and 62 and valve controllers 32, 34 and 36. Likewise, pressure measurement errors computed by ASICs 58, 60 and 62 may be transmitted to corresponding valve controllers 32, 34 and 36, as well as transmission control unit 38. A computed pressure measurement error may also be transmitted between multiple devices in succession. For example, a pressure measurement error computed by transmission control unit 38 may be transferred to the ASIC 58, which in turn can forward the pressure measurement error to valve controller 32. The computed pressure measurement error may be stored in memory of transmission control unit 38, ASICs 58, 60 and 62, and valve controllers 32, 34 and 36.

ASICs 58, 60 and 62 may use the computed pressure measurement error to compute a corrected pressure reading. The corrected pressure reading can be computed by adding the previously computed pressure measurement error to a pressure reading received from the corresponding pressure transducers 46, 48 and 50. The corrected pressure reading can be transmitted to valve controllers 32, 34 and 36, respectively. Upon receiving a command pressure from transmission control unit 38, valve controllers 32, 34 and 36 may use the corresponding corrected pressure reading received from ASICs 58, 60 and 62, respectively, to determine a valve setting (i.e. valve opening) for valves 12, 14 and 16 that will substantially produce (i.e., within a selected tolerance range) the command pressure received from transmission control unit 38. Valve controllers 32, 34 and 36 may formulate an appropriate valve control signal to produce the desired valve setting.

The pressure measurement error may also be utilized by transmission control unit 38 to compute a compensated command pressure that accounts for the inaccuracy of the pressure reading produced by the respective pressure transducer. Transmission control unit 38 may compute the pressure measurement error or may receive it from ASICs 58, 60 and 62. A compensated command pressure may be computed by adding the pressure measurement error associated with the respective pressure transducers 46, 48 and 50 to the corresponding command pressure (i.e., non-compensated command pressure) for the corresponding valve 12, 14 and 16, respectively. The compensated command pressure can be transmitted to the appropriate valve controller 32, 34 and 36. The compensated command pressure, together with the non-compensated pressure reading received from ASICs 58, 60 and 62 (based on the actual pressure reading of the corresponding pressure transducer 46, 48 and 50) may be used by corresponding valve controllers 32, 34 and 36 in the manner previously described to determine a valve setting for valves 12, 14 and 16 that will produce an output pressure corresponding to the non-compensated command pressure.

The pressure measurement error may also be used by valve controllers 32, 34 and 36 to compute a corrected pressure reading based on an uncorrected pressure reading received from corresponding pressure transducers 46, 48 and 50. The corrected pressure reading can be computed by adding the previously computed pressure measurement error to a pressure reading received from the corresponding pressure transducer. Upon receiving a command pressure from transmission control unit 38, valve controllers 32, 34 and 36 may use the corresponding corrected pressure reading to determine a valve setting (i.e. valve opening) for valves 12, 14 and 16 that will substantially produce (i.e., within a selected tolerance range) the command pressure received from transmission control unit 38. Valve controllers 32, 34 and 36 may formulate an appropriate valve control signal to produce the desired valve setting.

The pressure measurement error may also be used by valve controllers 32, 34 and 36 to compute a compensated command pressure based on a command pressure received from transmission control unit 38. The compensated command pressure can be computed by adding the previously computed pressure measurement error to the non-compensated command pressure received from transmission control unit 38. Valve controllers 32, 34 and 36 may use the compensated command pressure in conjunction with an uncorrected pressure reading received from the corresponding ASICs 58, 60 and 62 to determine a valve setting (i.e. valve opening) for valves 12, 14 and 16 that will substantially produce (i.e., within a selected tolerance range) the compensated command pressure. Valve controllers 32, 34 and 36 may formulate an appropriate valve control signal to produce the desired valve setting.

Figure 5:
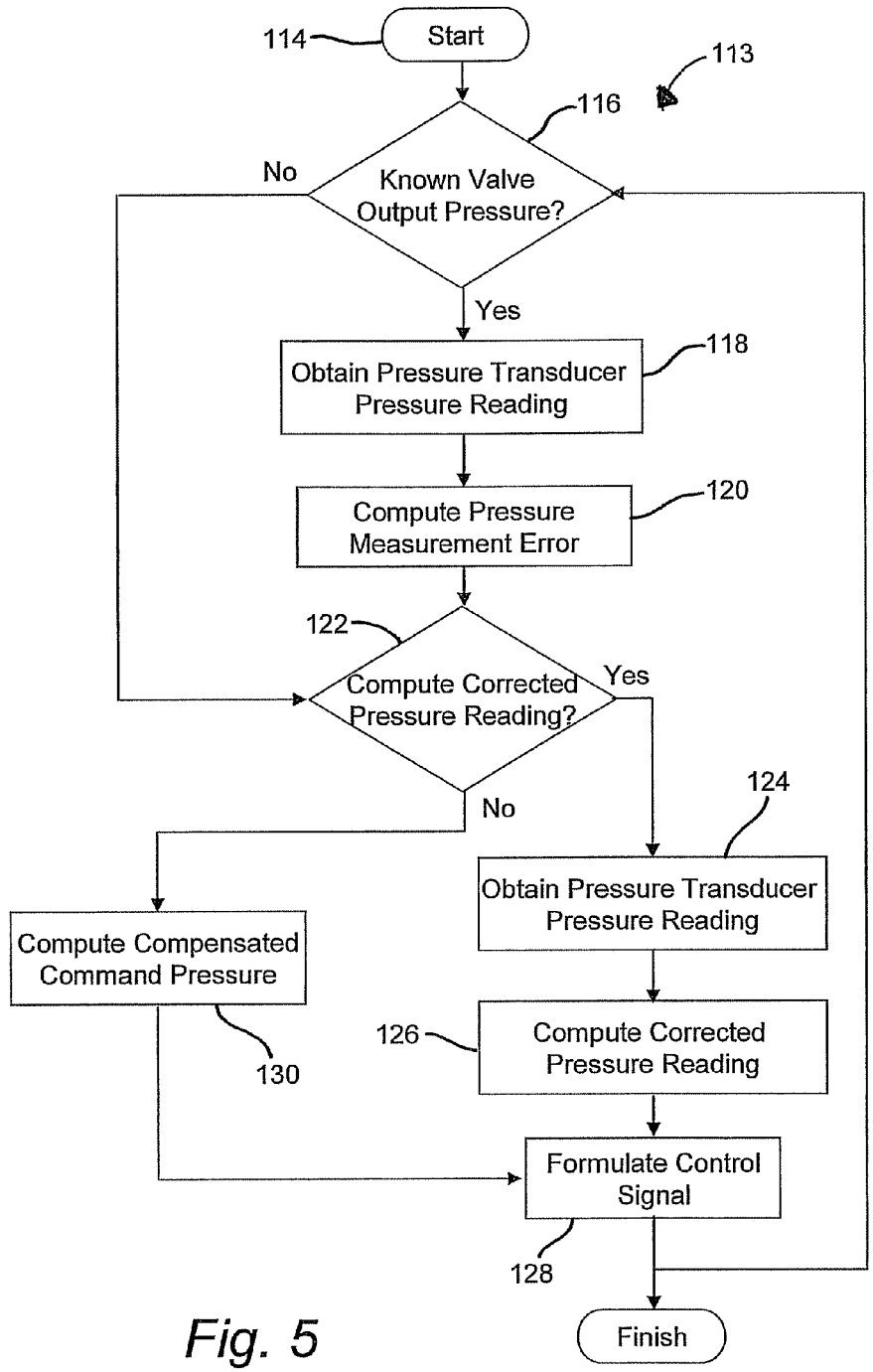
FIG. 5 is a flow chart depicting an exemplary correction scheme for computing a pressure measurement error.

Referring to FIG. 5, an exemplary error correction scheme 113 for computing a pressure measurement error is illustrated. The computed pressure measurement error can be used to compute a corrected pressure reading or a compensated command pressure depending on the requirements of the particular application.

Closed-loop pressure control system 10 may be initially energized at 114. This may occur, for example, when the vehicle ignition is first turned on. At 116 a determination is made as to whether the output pressure of the control valve is substantially known. The output pressure of the control valve is generally substantially known when, for example, pressure control system 10 is initially energized. Error correction scheme 10 will accordingly proceed to 118 to obtain an initial pressure reading from the pressure transducer at the time when the output pressure of the control valve is substantially known. The initial pressure reading and the substantially known output pressure of the control valve may then used to compute an initial pressure measurement error at 120.

The initial pressure measurement error may be used to compute a compensated pressure command and a corrected pressure reading. When using the initial pressure measure error to compute a corrected pressure reading, the error correction scheme proceeds to 124 where a second pressure reading may be obtained using the pressure transducer. At 126 a corrected pressure reading may be computed in the manner previously describe using the second pressure reading and the previously computed initial pressure measurement error. A control signal for controlling operation of the control valve may be formulated at 128 using the computed corrected pressure reading.

The initial pressure measurement error may also be used to compute a compensated pressure command at 130. The compensated command pressure may be computed in the manner previously described using the previously computed initial pressure measurement error and a non-compensated command pressure. A control signal for controlling operation of the control valve may be formulated at 128 using the computed corrected command pressure.

The computed pressure measurement error may be periodically updated to account for subsequent changes in the calibration of the pressure transducer. After formulating a control signal for controlling the operation of the control valve at 128, error correction scheme 113 can loop back to 116 to determine whether the control valve is subsequently operating at a condition in which the output pressure of the control valve is substantially known. If the output pressure is not substantially know, the previously computed pressure measurement error is not updated and the correction scheme proceeds to 122, at which point a corrected pressure reading or compensated command pressure may be computed using the previously computed initial pressure measurement error. If it is determined that the output pressure of the control valve is substantially known the error correction scheme proceeds to 118 and 120, where an updated pressure measurement error may be computed using a pressure transducer pressure reading obtained at the time when the output pressure of the control valve is substantially known. Thereafter, the updated pressure measurement error may be used to compute subsequent corrected pressure readings (124 and 126) and compensated command pressures (130) until such time as the pressure measurement error is once again updated.

The arrangements described above are merely illustrative examples of possible configurations. It shall be appreciated that the arrangement of the hydraulic system, as well as the configuration of the individual components, including but not limited to the pressure transducer packaging and the manifold, can have different configurations without departing from the scope of the claimed device. Further, although the above examples focus on an automotive transmission, it shall be understood that the herein describe device may be employed with any fluid pressure sensing system.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain features, and should in no way be construed so as to limit the scope of the claims.

It is to be understood that the above description is intended to be illustrative and not restrictive. Many arrangements and applications other than the examples provided would be apparent to those of skill in the art upon reading the above description. The scope of the disclosed system and processes should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the herein disclosed system and processes are capable of modification and variation and are limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system for controlling pressure in a transmission comprising:
a valve for regulating operation of a hydraulic device;
a pressure transducer for detecting an output pressure of the valve, the pressure transducer configured to output a pressure reading representing the detected pressure for a range of pressures both below and above a predetermined threshold pressure and to communicate the detected pressure for each of the pressures, a first pressure reading taken at an operating condition in which the actual output pressure of the valve is substantially known;
a microprocessor comprising logic for computing a pressure measurement error of the pressure transducer and a corrected pressure reading, the pressure measurement error computed using the first pressure reading and the substantially known actual output pressure of the valve and the corrected pressure reading computed using a first variable comprising a second pressure reading received from the pressure transducer taken subsequent to the first pressure reading, and a second variable comprising the previously computed pressure measurement error; and a valve controller for controlling the operation of the valve, the valve controller configured to receive as input from the microprocessor the corrected pressure reading and to output a control signal used to control the operation of the valve, the control signal formulated using the corrected pressure reading received from the microprocessor; and a transmission control unit configured to receive as input from the microprocessor the previously computed pressure measurement error, the transmission control unit comprising logic for computing an adjusted command pressure computed using a desired pressure to be output from the valve and the previously computed pressure measurement error received from the microprocessor.

2. The system of claim 1, further comprising:
a transmission control unit configured for outputting a command pressure corresponding to a desired pressure to be output from the valve;
wherein the valve controller is configured to receive as input from the transmission control unit the command pressure and as input from the microprocessor the corrected pressure reading, the valve controller further configured to output a control signal used to control the operation of the valve formulated using the command pressure received from the transmission control unit and the corrected pressure reading received from the microprocessor.

3. The system of claim 1, wherein the microprocessor computes the pressure measurement error of the pressure transducer in response to at least one of:
a distortion of a housing of the pressure transducer;
a wear of a transmission component; and
a degradation of transmission fluid.

4. The system of claim 1, wherein the microprocessor is configured to output a second pressure reading received from the pressure transducer, the second pressure reading taken subsequent to the first pressure reading, and the valve controller is configured to output a control signal used to control the operation of the valve, the control signal formulated using the adjusted command pressure received from the transmission control unit and the second pressure reading received from the microprocessor.

5. A system for controlling pressure in a transmission comprising:
a valve for regulating operation of a hydraulic device;
a pressure transducer for detecting an output pressure of the valve, the pressure transducer configured to output a pressure reading representing the detected pressure for a range of pressures both below and above a predetermined threshold pressure and to communicate the detected pressure for each of the pressures, a first pressure reading taken at an operating condition in which the actual output pressure of the valve is substantially known;
a microprocessor comprising logic for computing a pressure measurement error of the pressure transducer and a corrected pressure reading, the pressure measurement error computed using the first pressure reading and the substantially known actual output pressure of the valve and the corrected pressure reading computed using a first variable comprising a second pressure reading received from the pressure transducer taken subsequent to the first pressure reading, and a second variable comprising the previously computed pressure measurement error, and the microprocessor is configured to output the previously computed pressure measurement error and a command pressure corresponding to a desired pressure to be output from the valve;
a valve controller for controlling the operation of the valve, the valve controller configured to receive as input from the microprocessor the corrected pressure reading and to output a control signal used to control the operation of the valve, the control signal formulated using the corrected pressure reading received from the microprocessor; and
an application specific integrated circuit configured to receive as input from the microprocessor the previously computed pressure measurement error, the application specific integrated circuit unit comprising logic for computing a corrected pressure reading using the previously computed pressure measurement error received from the microprocessor and the first pressure reading output from the pressure transducer.

6. The system of claim 5, wherein the valve controller is configured to receive as input from the microprocessor the command pressure and from the application specific integrated circuit the corrected pressure reading, the valve controller configured to output a control signal used to control operation of the valve formulated using the command pressure received from the microprocessor and the corrected pressure reading received from the application specific integrated circuit.

7. The system of claim 5, wherein the valve is at least one of proportional valve, a variable bleed solenoid valve, a variable force solenoid valve and a pressure width modulation valve.

8. The system of claim 5, further comprising a hydraulic pump fluidly connected to the valve and configured to supply pressurized fluid to the valve.

9. A system for controlling pressure in a transmission comprising:
a valve for regulating operation of a hydraulic device;
a pressure transducer for detecting an output pressure of the valve, the pressure transducer configured to output a pressure reading representing the detected pressure for a range of pressures both below and above a predetermined threshold pressure and to communicate the detected pressure for each of the pressures, a first pressure reading taken at an operating condition in which the actual output pressure of the valve is substantially known;
a microprocessor comprising logic for computing a pressure measurement error of the pressure transducer and a corrected pressure reading, the pressure measurement error computed using the first pressure reading and the substantially known actual output pressure of the valve and the corrected pressure reading computed using a first variable comprising a second pressure reading received from the pressure transducer taken subsequent to the first pressure reading, and a second variable comprising the previously computed pressure measurement error; and
a valve controller for controlling the operation of the valve, the valve controller configured to receive as input from the microprocessor the corrected pressure reading and to output a control signal used to control the operation of the valve, the control signal formulated using the corrected pressure reading received from the microprocessor;
wherein the valve controller is configured to receive as input from the microprocessor the previously computed pressure measurement error and to output a control signal used to control the operation of the valve, the control signal formulated using the previously computed pressure measurement error received from the microprocessor.

10. The system of claim 9, wherein the valve is fluidly connected to a plurality of clutch actuators and configured to selectively adjust a pressure applied to a respective one of the clutch actuators so as to control an amount of torque transmitted by a clutch corresponding with a respective one of the clutch actuators.

11. The system of claim 9, wherein the valve controller electronically communicates with a transmission control unit by a wired mode of communication.

12. The system of claim 9, wherein the valve controller electronically communicates with a transmission control unit by a wireless mode of communication.

13. A system for controlling pressure in a transmission comprising:
   a valve for regulating operation of a hydraulic device;
   a pressure transducer for detecting an output pressure of the valve, the pressure transducer configured to output a pressure reading representing the detected pressure for a range of pressures both below and above a predetermined threshold pressure and to communicate the detected pressure for each of the pressures, a first pressure reading taken at an operating condition in which the actual output pressure of the valve is substantially known;
   a microprocessor comprising logic for computing a pressure measurement error of the pressure transducer and a corrected pressure reading, the pressure measurement error computed using the first pressure reading and the substantially known actual output pressure of the valve and the corrected pressure reading computed using a first variable comprising a second pressure reading received from the pressure transducer taken subsequent to the first pressure reading, and a second variable comprising the previously computed pressure measurement error;
   a valve controller for controlling the operation of the valve, the valve controller configured to receive as input from the microprocessor the corrected pressure reading and to output a control signal used to control the operation of the valve, the control signal formulated using the corrected pressure reading received from the microprocessor; and
   a transmission control unit is configured for outputting a command pressure corresponding to a desired pressure to be output from the valve;
   wherein the microprocessor is configured to output the previously computed pressure measurement error and a second pressure reading received from the pressure transducer taken subsequent to the first pressure reading;
   wherein the valve controller is configured to receive as input from the transmission control unit the command pressure and as input from the microprocessor the previously computed pressure measurement error and the second pressure reading, the valve controller configured to output a control signal used to control the operation of the valve, the control signal formulated using the previously computed pressure measurement error received from the microprocessor and at least one of the command pressure and the second pressure reading.

14. The system of claim 13, further comprising a valve driver and a solenoid configured to receive a voltage from the valve driver so as to move the valve between an open position and a closed position in response to receiving the voltage.

15. The system of claim 13, further comprising a pressure transducer configured to detect an output pressure of the valve.

16. The system of claim 15, wherein the pressure transducer is a piezoelectric sensor.

17. A system for controlling pressure in a transmission comprising:
   a valve for regulating operation of a hydraulic device;
   a pressure transducer for detecting an output pressure of the valve, the pressure transducer configured to output a pressure reading representing the detected pressure for a range of pressures both below and above a predetermined threshold pressure and to communicate the detected pressure for each of the pressures, a first pressure reading taken at an operating condition in which the actual output pressure of the valve is substantially known;
   a microprocessor comprising logic for computing a pressure measurement error of the pressure transducer and a corrected pressure reading, the pressure measurement error computed using the first pressure reading and the substantially known actual output pressure of the valve and the corrected pressure reading computed using a first variable comprising a second pressure reading received from the pressure transducer taken subsequent to the first pressure reading, and a second variable comprising the previously computed pressure measurement error;
   a valve controller for controlling the operation of the valve, the valve controller configured to receive as input from the microprocessor the corrected pressure reading and to output a control signal used to control the operation of the valve, the control signal formulated using the corrected pressure reading received from the microprocessor; and
   a transmission control unit is configured to receive as input from the microprocessor the previously computed pressure measurement error and to output a command pressure corresponding to the desired pressure to be output from the valve and the previously computed pressure measurement error received from the microprocessor;
   wherein the microprocessor is configured to output the previously computed pressure measurement error and a second pressure reading received from the pressure transducer, the second pressure reading taken subsequent to the first pressure reading;
   wherein the valve controller is configured to receive as input from the transmission control unit the command pressure and the previously computed pressure measurement error, and from the microprocessor the second pressure reading, the valve controller configured to output a control signal used to control the operation of the valve, the control signal formulated using the command pressure and the previously computed pressure measurement error received from the transmission control unit and the second pressure reading received from the microprocessor.

18. The system of claim 17, wherein the pressure transducer is a piezoelectric sensor.

19. The system of claim 17, further comprising an application specific integrated circuit configured to receive an electrical an electrical signal produced by the pressure transducer.

20. The system of claim 19, wherein the application specific integrated circuit communicates electronically with the valve controller and the transmission control unit.

21. A method for automatically detecting and compensating for measurement error of a pressure transducer comprising:
operating a pump to produce a flow of pressurized fluid for delivery to a valve;
arranging the valve in a configuration known to substantially produce a predetermined output pressure of the valve while operating the pump;
using the pressure transducer to detect an output pressure of a valve, the pressure transducer configured to output a pressure reading representing the detected pressure;
obtaining a first pressure reading while operating the pump with the valve arranged in the configuration known to substantially produce a predetermined output pressure of the valve;
computing a first pressure measurement error using the first pressure reading and the substantially known output pressure of the valve occurring at the time the first pressure reading is obtained;
obtaining a second pressure reading subsequent to the first pressure reading; and
computing a first corrected pressure reading using the first pressure reading and the first pressure measurement error.

22. The method of claim 21, further comprising:
obtaining a third pressure reading at a time when the output pressure of the valve is substantially known;
computing a second pressure measurement error using the third pressure reading and the substantially known output pressure of the valve occurring at the time the third pressure reading is obtained; and
computing a second corrected pressure reading using the third pressure reading and the second pressure measurement error.

23. The method of claim 22, wherein the first pressure measurement error is used to compute subsequent corrected pressure readings until the second pressure measurement error is computed, after which time the second pressure measurement error is used to compute subsequent corrected pressure readings.

24. The method of claim 21, further comprising formulating a control signal for controlling the operation of the valve using the first corrected pressure reading.

25. A method for automatically detecting and compensating for measurement error of a pressure transducer comprising:
operating a pump to produce a flow of pressurized fluid for delivery to a valve;
arranging the valve in a configuration known to substantially produce a predetermined output pressure of the valve while operating the pump;
using the pressure transducer to detect an output pressure of a valve, the pressure transducer configured to output a pressure reading representing the detected pressure;
obtaining a first pressure reading while operating the pump with the valve arranged in the configuration known to substantially produce a predetermined output pressure of the valve;
computing a first pressure measurement error using the first pressure reading and the substantially known output pressure of the valve occurring at the time the first pressure reading is obtained; and
computing a first compensated command pressure using a desired pressure to be output from the valve and the first pressure measurement error.

26. The method of claim 25, further comprising:
obtaining a third pressure reading at a time when the output pressure of the valve is substantially known;
computing a second pressure measurement error using the third pressure reading and the substantially known output pressure of the valve occurring at the time the third pressure reading is obtained; and
computing a second compensated command pressure using a desired pressure to be output from the valve and the second pressure measurement error.

27. The method of claim 26, wherein the first pressure measurement error is used to compute subsequent compensated command pressures until the second pressure measurement error is computed, after which time the second pressure measurement error is used to compute subsequent compensated command pressures.

28. The method of claim 25, further comprising formulating a control signal for controlling the operation of the valve using the first compensated command pressure.

29. A method for automatically detecting and compensating for measurement error of a pressure transducer comprising:
operating a pump to produce a flow of pressurized fluid for delivery to a valve;
arranging the valve in a configuration known to substantially produce a predetermined output pressure of the valve while operating the pump;
using the pressure transducer to detect an output pressure of a valve, the pressure transducer configured to output a pressure reading representing the detected pressure;
obtaining a first pressure reading while operating the pump with the valve arranged in the configuration known to substantially produce a predetermined output pressure of the valve; and
computing a first pressure measurement error using the first pressure reading and the substantially known output pressure of the valve occurring at the time the first pressure reading is obtained;
wherein the first pressure reading is obtained when the valve is closed.

30. The method of claim 29, wherein computing the substantially known output pressure of the valve occurs when a vehicle transmission is placed in park.

31. The method of claim 29, wherein computing the substantially known output pressure of the valve occurs when a transmission control unit sends a control signal that causes the valve to close.

32. The method of claim 29, wherein computing the substantially known output pressure of the valve occurs during at least one of a gear shift change and a period after a vehicle started up.

* * * * *